Patented June 24, 1930

1,768,175

UNITED STATES PATENT OFFICE

FERNANDO SOMOZA VIVAS, OF NEW YORK, N. Y., ASSIGNOR TO INTERNATIONAL FIRE-PROOF PRODUCTS CORPORATION, OF NEW YORK, N. Y., A CORPORATION OF DELAWARE

PROCESS OF TREATING WOOD

No Drawing. Application filed October 8, 1927. Serial No. 225,037.

The invention relates to a process of treating wood and has as an object rendering of the wood free from attacks of insects.

It is a further object of the invention to provide a wood which will not be attacked by insects and which is fireproof or exceedingly fire-resistant.

It is a further object of the invention to impregnate wood with an artificial malachite for the purposes already named.

An illustrative embodiment of the process for carrying out the objects of the invention is as follows:

The wood is first subjected to a vacuum and is then without breaking the vacuum submerged in a solution of sodium carbonate of a desirable strength of two and one-half pounds to the gallon of water. After thorough saturation of the timber, the timber is dried in a vacuum to remove substantially sixty per cent of the water of the solution.

The timber is next treated under pressure by forcing into its pores a solution of copper sulphate of a desirable strength of one-half pound of sulphate to a gallon of water thereby depositing in the pores of the wood malachite of the formula $Cu_2(OH)_2CO_3$. This material is poisonous to all insect life such as teredo, white ants, etc. The timber is then dried and is ready for use.

In addition to its insect proof qualities, the thus treated timber is waterproof and exceedingly fire-resistant, and is very desirable for use as piling, and in the construction of buildings subjected to the attacks of white ants or other insects, and will not be attacked by fungus growths.

Minor changes may be made in the steps of the process and in the proportions of the substances named within the scope of the appended claims without departing from the spirit of the invention.

I claim:

1. The process of treating wood to make the same insect-proof and fire-proof which comprises introducing sodium carbonate into the pores of the wood and subsequently introducing copper sulphate into said pores whereby to precipitate malachite therein.

2. The process of treating wood to make the same insect-proof and fire-proof which comprises introducing a solution of sodium carbonate into the pores of the wood, drying the wood to remove a substantial portion of the water of the solution, introducing a solution of copper sulphate into the pores of the wood, drying the completed product.

3. The process of treating wood to make the same insect-proof and fire-proof which comprises saturating the wood with a solution of sodium carbonate comprising substantially two and one-half pounds of carbonate to the gallon of water, drying the wood in vacuum until substantially sixty per cent of the water is removed, placing the wood in a solution of copper sulphate in substantially the proportion of one-half pound of sulphate to a gallon of water and forcing the solution into the pores of the wood under pressure, withdrawing the solution and drying the wood.

FERNANDO SOMOZA VIVAS.